(12) United States Patent
Ho et al.

(10) Patent No.: US 11,017,301 B2
(45) Date of Patent: May 25, 2021

(54) OBTAINING AND USING A DISTRIBUTED REPRESENTATION OF CONCEPTS AS VECTORS

(71) Applicant: International Business Machines Corporation, Armonk, NY (US)

(72) Inventors: Tin Kam Ho, Millburn, NJ (US); Luis A. Lastras-Montano, Cortlandt Manor, NY (US); Oded Shmueli, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1142 days.

(21) Appl. No.: 14/809,744

(22) Filed: Jul. 27, 2015

(65) Prior Publication Data
US 2017/0032273 A1    Feb. 2, 2017

(51) Int. Cl.
| G06N 20/00 | (2019.01) |
| G06N 5/04 | (2006.01) |
| G06F 16/24 | (2019.01) |
| G06N 7/00 | (2006.01) |
| G06F 40/216 | (2020.01) |
| G06F 16/2452 | (2019.01) |

(52) U.S. Cl.
CPC ......... *G06N 5/04* (2013.01); *G06F 16/24522* (2019.01); *G06F 40/216* (2020.01); *G06N 7/005* (2013.01); *G06N 20/00* (2019.01)

(58) Field of Classification Search
CPC ....................................................... G06N 5/02
See application file for complete search history.

(56) References Cited

U.S. PATENT DOCUMENTS

| 6,252,988 | B1 | 6/2001 | Ho |
| 7,050,977 | B1 | 5/2006 | Bennett |
| 7,194,483 | B1 | 3/2007 | Mohan et al. |
| 8,250,071 | B1 | 8/2012 | Killalea et al. |
| 8,949,242 | B1 | 2/2015 | Lin et al. |
| 2006/0020566 | A1* | 1/2006 | Wu ........................ G06Q 10/10 706/50 |
| 2007/0143322 | A1 | 6/2007 | Kothari et al. |
| 2008/0228496 | A1 | 9/2008 | Yu et al. |

(Continued)

FOREIGN PATENT DOCUMENTS

WO    2012096868 A1    7/2012

OTHER PUBLICATIONS

X. Hu et al., "Exploiting Wikipedia as External Knowledge for Document Clustering", Assoc. Comp. Mach., Proc. Knowl. Disc. and Data Mining, Jun. 28-Jul. 1, 2009, Paris, France, pp. 389-396. (Year: 2009).*

(Continued)

*Primary Examiner* — Vincent Gonzales
(74) *Attorney, Agent, or Firm* — Terrile, Cannatti & Chambers, LLP; Michael Rocco Cannatti

(57) ABSTRACT

An approach is provided for automatically generating and processing concept vectors by extracting concept sequences from one or more content sources and generating a first concept vector for a first concept by supplying the concept sequences as inputs to a vector learning component, such that the first concept vector comprises information interrelating the first concept to other concepts in the concept sequences which is inferred from the concept sequences.

21 Claims, 3 Drawing Sheets

(56) References Cited

U.S. PATENT DOCUMENTS

| | | |
|---|---|---|
| 2012/0166180 A1 | 6/2012 | Au |
| 2012/0232902 A1 | 9/2012 | Bocchieri et al. |
| 2013/0144605 A1 | 6/2013 | Brager et al. |
| 2013/0151525 A1 | 6/2013 | Ankan et al. |
| 2014/0046959 A1* | 2/2014 | Moreels ............ G06F 17/30958 707/748 |
| 2014/0067368 A1 | 3/2014 | Yih et al. |
| 2014/0181109 A1 | 6/2014 | Lin et al. |
| 2014/0229163 A1 | 8/2014 | Gliozzo |
| 2014/0249799 A1 | 9/2014 | Yih et al. |
| 2014/0258254 A1 | 9/2014 | Suleiman et al. |
| 2015/0033120 A1 | 1/2015 | Cooke et al. |
| 2016/0012057 A1 | 1/2016 | Franceschini et al. |
| 2016/0224473 A1 | 8/2016 | Acar et al. |
| 2016/0259826 A1 | 9/2016 | Acar et al. |
| 2016/0299975 A1 | 10/2016 | Acar et al. |

OTHER PUBLICATIONS

Yilmaz, H. and P. Senkul, "Using ontology and sequence information for extracting behavior patterns from web navigation logs", 2010 IEEE Intl Conf. on Data Mining Workshops, pp. 549-556. (Year: 2010).*

Rowena Chau et al., A ConceptLink graph for text structure mining, 32nd Australasian Computer Science Conference (ACSC2009), Australian Computer Society, Wellington, New Zealand, Jan. 2009.

Bryan Perozzi et al., DeepWalk: Online Learning of Social Representations, KDD '14, Proceedings of the 20th ACM SIGKDD International Conference on Knowledge Discovery and Data Mining, pp. 701-710, 2014.

Yoav Goldberg et al., word2vec Explained: Deriving Mikolov et al.'s Negative Sampling Word-Embedding Method, Feb. 14, 2014.

Jeffrey Pennington et al., GloVe: Global Vectors for Word Representation, 2014 http://nlp.stanford.edu/pubs.glove.pdf.

Omer Levy et al., Dependency-Based Word Embeddings, Proceedings of the 52nd Annual Meeting of the Association for Computational Linguistics (Short Papers), Jun. 23-25, 2014, pp. 302-308.

Omer Levy et al., Linguistic Regularities in Sparse and Explicit Word Representations, 2014 https://levyomer.files.wordpress.com/2014/04/linguistic-regularities-in-sparse-and-explicit-word-representations-conll-2014.pdf.

Omer Levy et al., Neural Word Embedding as Implicit Matrix Factorization, Advances in Neural Information Processing Systems 27 (NIPS 2014).

Quoc Le et al., Distributed Representations of Sentences and Documents, arXiv:1405.4053v2 [cs.CL], May 22, 2014.

Tomas Mikolov et al., Efficient Estimation of Word Representations in Vector Space, arXiv:1301.3781, arXiv:1301.3781v3 [cs.CL], Sep. 7, 2013.

Tomas Mikolov et al., Exploiting Similarities among Languages for Machine Translation, arXiv:1309.4168v1 [cs. CL] Sep. 17, 2013, http://arxiv.org/pdf/1309.4168.pdf.

Tomas Mikolov et al., Linguistic Regularities in Continuous Space Word Representations, Proceedings of NAACL-HLT 2013, pp. 746-751, Atlanta, Georgia, Jun. 9-14, 2013, http://www.aclweb.org/anthology/N13-1090.

Xin Rong, word2vec Parameter Learning Explained, arXiv:1411.2738v1 [cs.CL], Nov. 11, 2014.

R. High, "The Era of Cognitive Systems: An Inside Look at IBM Watson and How it Works," IBM Redbooks, 2012.

Yuan et al., "Watson and Healthcare," IBM developerWorks, 2011.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

Jatowt, Adam et al., "A Framework for Analyzing Semantic Change of Words Across Time," Proceedings of the 14th ACM/IEEE-CS Joint Conference on Digital Libraries, IEEE Press, 2014.

Wang, Shenghui et al., "Concept Drift and How to Identify It," Web Semantics; Science, Services and Agents on the World Wide Web 9.3 (2011): 247-265.

Peter Dombrowski et al., "Identifying disruptive innovation: Innovation theory and the defense industry." Innovations: Technology, Governance, Globalization 4.2 (2009): 101-117.

Tin Kam Ho et al., "Concept evolution modeling using semantic vectors." Proceedings of the 25th International Conference Companion on World Wide Web, International World Wide Web Conferences Steering Committee, 2016.

Delmer Nagy et al., "Defining and identifying disruptive innovations." Industrial Marketing Management 57 (2016): 119-126.

List of IBM Patents or Applications Treated as Related, Oct. 2018.

Wang, Shenghui et al., "What is concept drift and how to measure it?," International Conference on Knowledge Engineering and Knowledge Management, Springer, Berlin, Heidelberg, 2010.

Delany, Sarah Jane et al., "A case-based technique for tracking concept drift in spam filtering," Knowledge-based systems 18.4-5, 2005, pp. 187-195.

Klinkenberg, Ralf et al., "Detecting Concept Drift with Support Vector Machines," ICML, 2000.

Kontostathis, April et al., A survey of emerging trend detection in textual data mining, Survey of text mining, Springer, New York NY, 2004, 185-224.

Furukawa et al., Identifying the Evolutionary Process of Emerging Technologies: A Chronological Network Analysis of World Wide Web Conference Sessions, Technological Forecasting and Social Change, 2014.

Tugrul Daim et al., Detecting potential technological fronts by comparing scientific papers and patents, Foresight, 2011.

Wijaya, Derry Tanti et al., Understanding Semantic Change of Words Over Centuries, Proceedings of the 2011 International Workshop on DETecting and Exploiting Cultural DiversiTy on the Social Web, ACM 2011.

Hamilton, William L. et al., Cultural Shift or Linguistic Drift? Comparing Two Computational Measures of Semantic Change, Proceedings of the Conference on Empirical Methods in Natural Language Processing, vol. 2016, NIH Pub.

Pottenger, William M. et al., Detecting Emerging Concepts in Textual Data Mining, Computational Information Retrieval, 100.1 (2001): 89-105.

Kontostathis, April et al., User of Term Clusters for Emerging Trend Detection, Preprint (2004).

Le, Minh-Hoang et al., Detecting Emerging Trends from Scientific Corpora, International Journal of Knowledge and Systems Sciences 21 (2005): 53-59.

Hong Zhe Liu et al., Concept Vector for Similarity Measurement Based on Hierarchical Domain Structure, Computing and Informatics 30.5: 881-900, 2012.

Ainura Madylova et al., A Taxonomy Based Semantic Similarity of Documents Using the Cosine Measure, 2009 24th International Symposium on Computer and Information Sciences, IEEE, 2009.

* cited by examiner

OBTAINING AND USING A DISTRIBUTED REPRESENTATION OF CONCEPTS AS VECTORS

BACKGROUND OF THE INVENTION

In the field of artificially intelligent computer systems capable of answering questions posed in natural language, cognitive question answering (QA) systems (such as the IBM Watson™ artificially intelligent computer system or and other natural language question answering systems) process questions posed in natural language to determine answers and associated confidence scores based on knowledge acquired by the QA system. In operation, users submit one or more questions through a front-end application user interface (UI) or application programming interface (API) to the QA system where the questions are processed to generate answers that are returned to the user(s). The QA system generates answers from an ingested knowledge base corpus, including publicly available information and/or proprietary information stored on one or more servers, Internet forums, message boards, or other online discussion sites. Using the ingested information, the QA system can formulate answers using artificial intelligence (AI) and natural language processing (NLP) techniques to provide answers with associated evidence and confidence measures. However, the quality of the answer depends on the ability of the QA system to identify and process information contained in the knowledge base corpus.

With some traditional QA systems, there are mechanisms provided for processing information in a knowledge base by using vectors to represent words to provide a distributed representation of the words in a language. Such mechanisms include "brute force" learning by various types of Neural Networks (NNs), learning by log-linear classifiers, or various matrix formulations. Lately, word2vec, that uses classifiers, has gained prominence as a machine learning technique which is used in the natural language processing and machine translation domains to produce vectors which capture syntactic as well semantic properties of words. Matrix based techniques that first extract a matrix from the text and then optimize a function over the matrix have recently achieved similar functionality to that of word2vec in producing vectors. However, there is no mechanism in place to identify and/or process concepts in an ingested corpus which are more than merely a sequence of words. Nor are traditional QA systems able to identify and process concept attributes in relation to other concept attributes. Instead, existing attempts to deal with concepts generate vector representations of words that carry various probability distributions derived from simple text in a corpus, and therefore provide only limited capabilities for applications, such as NLP parsing, identification of analogies, and machine translation. As a result, the existing solutions for efficiently identifying and applying concepts contained in a corpus are extremely difficult at a practical level.

SUMMARY

Broadly speaking, selected embodiments of the present disclosure provide a system, method, and apparatus for processing of inquiries to an information handling system capable of answering questions by using the cognitive power of the information handling system to generate or extract a sequence of concepts, to extract or compute therefrom a distributed representation of the concept(s) (i.e., concept vectors), and to process the distributed representation (the concept vectors) to carry out useful tasks in the domain of concepts and user-concept interaction. In selected embodiments, the information handling system may be embodied as a question answering (QA) system which has access to structured, semi-structured, and/or unstructured content contained or stored in one or more large knowledge databases (a.k.a., "corpus"), and which extracts therefrom a sequence of concepts from annotated text (e.g., hypertext with concept links highlighted), from graph representations of concepts and their inter-relations, from tracking the navigation behavior of users, or a combination thereof. In other embodiments, concept vectors may also be used in a "discovery advisor" context where users would be interested in seeing directly the concept-concept relations, and/or use query concepts to retrieve and relate relevant documents from a corpus. To compute the concept vector(s), the QA system may process statistics of associations in the concept sequences using vector embedding methods. Finally, processing of the concept vectors enables improved presentation and visualization of concepts and their inter-relations to improve the quality of answers provided by the QA system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
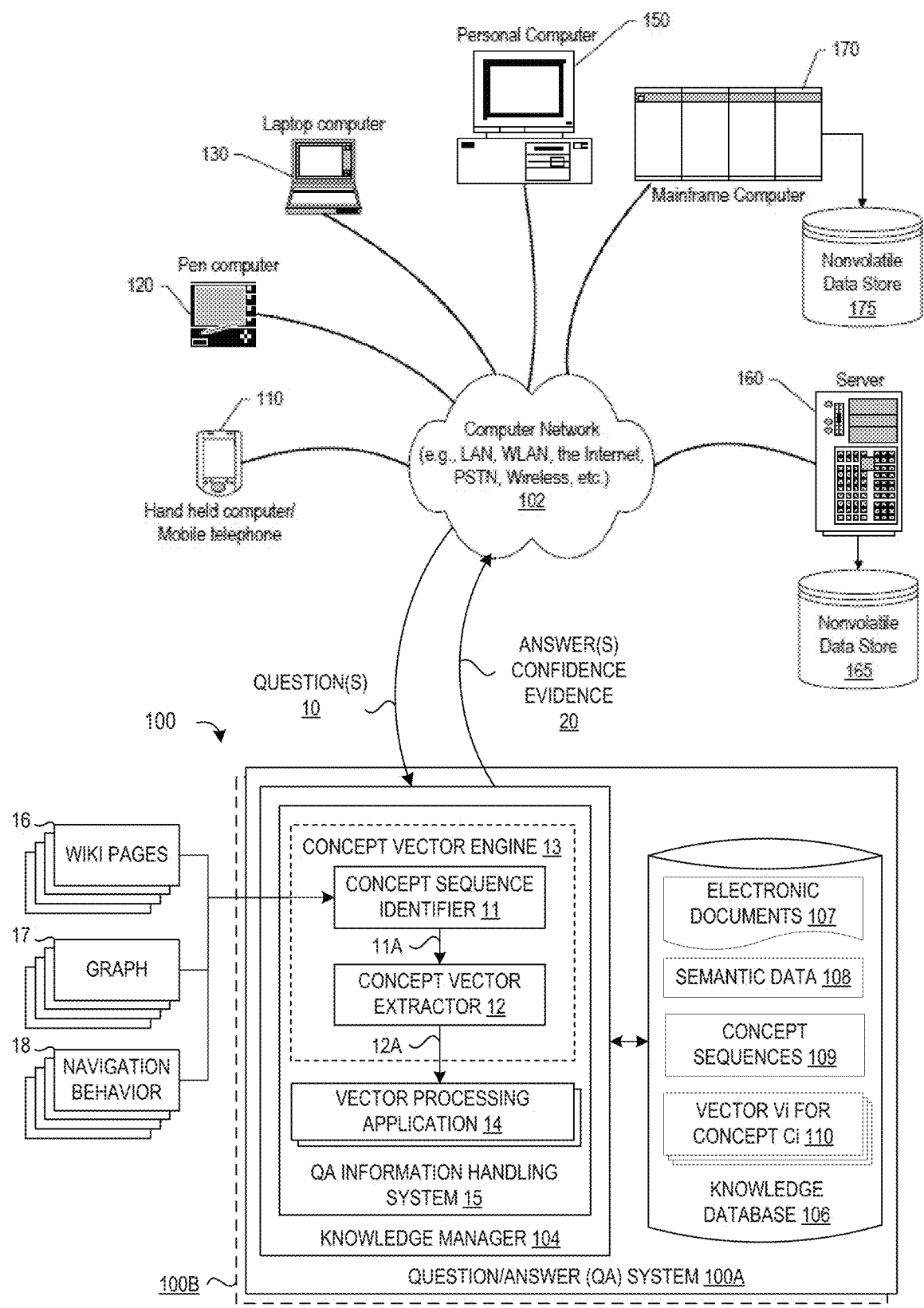
FIG. 1 depicts a network environment that includes a knowledge manager that uses a knowledge base and a vector concept engine for identifying and processing vector concepts extracted from the knowledge base.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer (QA) system 100 connected to a computer network 102. The QA system 100 may include one or more QA system pipelines 100A, 100B, each of which includes a knowledge manager computing device 104 (comprising one or more processors and one or more memories, and potentially any other computing device elements generally known in the art including buses, storage devices, communication interfaces, and the like) for processing questions received over the network 102 from one or more users at computing devices (e.g., 110, 120, 130). Over the network 102, the computing devices communicate with each other and with other devices or components via one or more wired and/or wireless data communication links, where each communication link may comprise one or more of wires, routers, switches, transmitters, receivers, or the like. In this networked arrangement, the QA system 100 and network 102 may enable question/answer (QA) generation functionality for one or more content users. Other embodiments of QA system 100 may be used with components, systems, sub-systems, and/or devices other than those that are depicted herein.

In the QA system 100, the knowledge manager 104 may be configured to receive inputs from various sources. For example, knowledge manager 104 may receive input from the network 102, one or more knowledge bases or corpora of electronic documents 106 which stores electronic documents 107, semantic data 108, or other possible sources of data input. In selected embodiments, the knowledge base 106 may include structured, semi-structured, and/or unstructured content in a plurality of documents that are contained in one or more large knowledge databases or corpora. The various computing devices (e.g., 110, 120, 130) on the network 102 may include access points for content creators and content users. Some of the computing devices may include devices for a database storing the corpus of data as the body of information used by the knowledge manager 104 to generate answers to questions. The network 102 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager, with the knowledge manager also including input interfaces to receive knowledge requests and respond accordingly.

In one embodiment, the content creator creates content in an electronic document 107 for use as part of a corpus of data with knowledge manager 104. Content may also be created and hosted as information in one or more external sources 16-18, whether stored as part of the knowledge database 106 or separately from the QA system 100A. Wherever stored, the content may include any file, text, article, or source of data (e.g., scholarly articles, dictionary definitions, encyclopedia references, and the like) for use in knowledge manager 104. Content users may access knowledge manager 104 via a network connection or an Internet connection to the network 102, and may input questions to knowledge manager 104 that may be answered by the content in the corpus of data. As further described below, when a process evaluates a given section of a document for semantic content 108, the process can use a variety of conventions to query it from the knowledge manager. One convention is to send a question 10. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions 10 (e.g., natural language questions, etc.) to the knowledge manager 104. Knowledge manager 104 may interpret the question and provide a response to the content user containing one or more answers 20 to the question 10. In some embodiments, knowledge manager 104 may provide a response to users in a ranked list of answers 20.

In some illustrative embodiments, QA system 100 may be the IBM Watson™ QA system available from International Business Machines Corporation of Armonk, N.Y., which is augmented with the mechanisms of the illustrative embodiments described hereafter for identifying and processing concept vectors which may aid in the process of answering questions. The IBM Watson™ knowledge manager system may receive an input question 10 which it then parses to extract the major features of the question, that in turn are used to formulate queries that are applied to the corpus of data stored in the knowledge base 106. Based on the application of the queries to the corpus of data, a set of hypotheses, or candidate answers to the input question, are generated by looking across the corpus of data for portions of the corpus of data that have some potential for containing a valuable response to the input question.

In particular, a received question 10 may be processed by the IBM Watson™ QA system 100 which performs deep analysis on the language of the input question 10 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e., candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

To improve the quality of answers provided by the QA system 100, the concept vector engine 13 may be embodied as part of a QA information handling system 15 in the knowledge manager 104, or as a separate information handling system, to execute a concept vector identification process that extracts a sequence of concepts from annotated text sources 16 (e.g., sources specializing in concepts, such as Wikipedia pages with concepts highlighted or hyperlinked), from graph representations 17 of concepts and their inter-relations, from tracking the navigation behavior of users 18, or a combination thereof, and to construct therefrom one or more vectors for each concept 110. Syntactically, a "concept" is a single word or a word sequence (e.g., "gravity", "supreme court", "Newton's second law", "Albert Einstein") which becomes a semantic "concept" once it has been designated by a community to have a special role, namely—as representing more than just a sequence of words. In addition, a concept has many attributes: field of endeavor, origin, history, an associated body of work and/or knowledge, cultural and/or historical connotation and more. So, although superficially, words, phrases and concepts seem similar, a word sequence becomes a concept when it embeds a wider cultural context and a designation by a community, encompassing a significant meaning and presence in an area, in a historical context, in its relationships to other concepts and in ways it influences events and perceptions. It is worth emphasizing the point that not every well-known sequence of words is a concept, and the declaration of a sequence of words to be a concept is a community decision which has implications regarding naturally-arising sequences of concepts. With this understanding, the concept vector engine 13 may include a concept sequence identifier 11 which accesses sources 16-18 for sequences of concepts embedded in texts of various kinds and/or which arise by tracking concept exploration behavior from examining non-text sources, such as click streams. As different concept sequences are identified, the adjacency of the concepts is tied to the closeness of the concepts themselves. Once concept sequences are available, a concept vector extractor 12 acts as a learning device to extract vector representations for the identified concepts. The resulting concept vectors 110 may be stored in the knowledge database 106 or directly accessed by one or more vector processing applications 14.

To identify or otherwise obtain a sequence of concepts, a concept vector identifier 11 may be provided to (i) access one or more wiki pages 16 or other text source which contains these concepts by filtering out words that are not concepts, (ii) algorithmically derive concept sequences from a graph 17 (e.g., a Concept Graph (CG)), (iii) track one or more actual users' navigation behavior 18 over concepts, or some modification or combination of one of the foregoing. For example, the concept vector identifier 11 may be configured to extract concepts from a text source, but also some text words extracted per concept in the context surrounding the concept's textual description, in which case the concepts are "converted" to new unique words.

To provide a first illustrative example, the concept vector identifier 11 may be configured to derive concept sequences 11A from one or more Wikipedia pages 16 by eliminating all words from a page that are not concepts (i.e., Wikipedia entries). For example, consider the following snippet from the Wikipedia page for Photonics at http://en.wikipedia.org/wiki/Photonics in which the concepts are underlined:

Photonics as a field began with the invention of the laser in 1960. Other developments followed: the laser diode in the 1970s, optical fibers for transmitting information, and the erbium-doped fiber amplifier. These inventions formed the basis for the telecommunications revolution of the late 20th century and provided the infrastructure for the Internet.

Though coined earlier, the term photonics came into common use in the 1980s as fiber-optic data transmission was adopted by telecommunications network operators. At that time, the term was used widely at Bell Laboratories. Its use was confirmed when the IEEE Lasers and Electro-Optics Society established an archival journal named Photonics Technology Letters at the end of the 1980s.

During the period leading up to the dot-corn crash circa 2001, photonics as a field focused largely on optical telecommunications.

In this example, the concept sequence 11A derived by the concept vector identifier 11 is: laser, laser diode, optical fibers, erbium-doped fiber amplifier, Internet, Bell Laboratories, IEEE Lasers and Electro-Optics Society, Photonics Technology Letters, dot-com crash. However, it will be appreciated that the concept vector identifier 11 may examine a "dump" of Wikipedia pages 16 to obtain long concept sequences reflecting the whole collection of Wikipedia concepts.

In another illustrative example, the concept vector identifier 11 may be configured to derive concept sequences 11A from one or more specific domains. For example, a pharmaceutical company's collection of concerned diseases, treatments, drugs, laboratory tests, clinical trials, relevant chemical structures and processes, or even biological pathways may be accessed by the concept vector identifier 11 to extract domain-specific concept sequences. In this example, concept sequences may be extracted from company manuals, emails, publications, reports, and other company-related text sources.

In another illustrative example, the concept vector identifier 11 may be configured to derive concept sequences 11A which also include non-concept text. For example, an identified concept sequence may include inserted "ordinary" or non-concept words which are used for learning. One option would be to use all the words from the original source text by converting "concept" words into "new" words by appending a predetermined suffix (e.g., "_01") to each concept. In the example "Photonics" page listed above, this approach would lead to the following first paragraph: "Photonics as a field began with the invention of the laser 01 in 1960. Other developments followed: the laser diode 01 in the 1970s, optical fibers 01 for transmitting information, and the erbium-doped fiber amplifier 01. These inventions formed the basis for the telecommunications revolution of the late 20th century and provided the infrastructure for the Internet 01."

Another option for deriving concept sequences with text would be to process the original source text by a filtering process that retains only the parts of the text relevant to a specific theme. For example, if the original source text consists of a collection of medical documents, a search procedure can be applied to identify and retrieve only the documents containing the word "cancer." The retrieved documents are taken as the theme-restricted collection for deriving the concept sequences.

Another option for deriving concept sequences with text would be to process the original source text to keep only words that are somewhat infrequent as indicated by an occurrence threshold, and that are in close proximity to a concept. In the example "Photonics" page listed above, this approach would lead to the following first paragraph: "invention laser 01 1960. developments laser diode 01 1970s, optical fibers 01 transmitting information erbium-doped fiber amplifier 01 telecommunications revolution infrastructure Internet 01."

Another option for deriving concept sequences is to construct sequences of concepts and words in units and (potentially rearranged) orderings, as determined by a natural language parser.

Another option for deriving concept sequences with text would be to explicitly specify a collection of words or types of words to be retained in the concept sequence. For example, one may have a specified collection of words connected to medicine (e.g., nurse, doctor, ward and operation), and the derived concept sequence would limit retained non-concept words or text to this specified collection.

To provide a second illustrative example of the concept sequence identifier process, the concept vector identifier 11 may be configured to derive concept sequences (e.g., 11A) from one or more concept graphs 17 having nodes which represent concepts (e.g., Wikipedia concepts). As will be appreciated, a graph 17 may be constructed by any desired method (e.g., Google, etc.) to define "concept" nodes which may be tagged with weights indicating their relative importance. In addition, an edge of the graph is labeled with the strength of the connection between the concept nodes it connects. When edge weights are given, they indicate the strength or closeness of these concepts, or observed and recorded visits by users in temporal proximity. An example way of relating the edge weights to user visits is to define the edge weight connecting concept "A" to concept "B" to be the number of times users examined concept "A" and, within a short time window, examined concept "B".

Using the Wikipedia example, if a Wikipedia page "A" has a link to another Wikipedia page "B," then the graph 17 would include an edge connecting the "A" concept to the "B" concept. The weight of a node (importance) or the weight (strength) of an edge of an edge may be derived using any desired technique, such as a personalized Pagerank of the graph or other techniques. In addition, each concept i in the graph 17 may be associated with a (high dimensional) P-vector such that the $j^{th}$ entry of the P-vector corresponding to concept i is the strength of the connection between concept i and concept j. The entries of the P-vector may be used to assign weights to graph edges. To derive concept sequences from the concept graph(s) 17, the concept vector identifier 11 may be configured to perform random walks on the concept graph(s) 17 and view these walks as concept sequences. For example, starting with a randomly chosen starting node v, the concept vector identifier 11 examines the G-neighbors of v and the weights on the edges connecting v and its neighboring nodes. Based on the available weights (if none are available, the weights are considered to be equal), the next node is randomly chosen to identify the next node (concept) in the sequence where the probability to proceed to a node depends on the edge weight and the neighboring node's weight relative to other edges and neighboring nodes. This random walk process may be continued until a concept sequence of length H is obtained, where H may be a specified parametric value (e.g., 10,000). Then, the random walk process may be repeated with a new randomly selected starting point. If desired, the probability of selecting a node as a starting node may be proportional to its weight (when available). The result of a plurality of random walks on the graph 17 is a collection of length H sequences of concepts 11A.

Extracting sequences from the concept graph(s) 17 may also be done by using a random walk process in which each step has a specified probability that the sequence jumps back to the starting concept node (a.k.a., "teleportation"), thereby mimicking typical navigation behavior. Alternatively, a random walk process may be used in which each step has a specified probability that the sequence jumps back to the previous concept node, thereby mimicking other typical navigation behavior. If desired, a combination of the foregoing step sequences may be used to derive a concept sequence. Alternatively, a concept sequence may be derived by using a specified user behavior model M that determines the next concept to explore. Such a model M may employ a more elaborate scheme in order to determine to which concept a user will examine next, based on when previous concepts were examined and for what duration.

The resulting concept sequences 11A may be stored in the knowledge database 109 or directly accessed by the concept vector extractor 12. In addition, whenever changes are made to a concept graph 17, the foregoing process may be repeated to dynamically maintain concept sequences by adding new concept sequences 11A and/or removing obsolete ones. By revisiting the changed concept graph 17, previously identified concept sequences can be replaced with new concept sequences that would have been used, thereby providing a controlled time travel effect.

In addition to extracting concepts from annotated text 16 and/or graph representations 17, concept sequences 11A may be derived using graph-based vector techniques whereby an identified concept sequence 11A also includes a vector representation of the concept in the context of graph G (e.g., Pagerank-derived vectors). This added information about the concepts in the sequence 11A can be used to expedite and qualitatively improve the learning of parameters process, and learning quality, by providing grouping, i.e., additional information about concepts and their vicinity as embedded in these G-associated vectors.

To provide a third illustrative example of the concept sequence identifier process, the concept vector identifier 11 may be configured to derive concept sequences (e.g., 11A) from the user navigation behavior 18 where selected pages visited by a user (or group of users) represent concepts. For example, the sequences of concepts may be the Wikipedia set of entries explored in succession by (a) a particular user, or (b) a collection of users. The definition of succession may allow non-Wikipedia intervening web exploration either limited by duration T (before resuming Wikipedia), number of intervening non-Wikipedia explorations, or a combination of theses or related criteria. As will be appreciated, user navigation behavior 18 may be captured and recorded using any desired method for tracking a sequence of web pages a user visits to capture or retain the "concepts" corresponding to each visited page and to ignore or disregard the pages that do not correspond to concepts. Each concept sequence 11A derived from the captured navigation behavior 18 may correspond to a particular user, and may be concatenated or combined with other user's concept sequences to obtain a long concept sequence for use with concept vector training. In other embodiments, the navigation behavior of a collection of users may be tracked to temporally record a concept sequence from all users. While such collective tracking blurs the distinction between individual users, this provides a mechanism for exposing a group effort. For example, if the group is a limited-size departmental unit (say, up to 20), the resulting group sequence 11A can reveal interesting relationships between the concepts captured from the user navigation behavior 18. The underlying assumption is that the group of users is working on an interrelated set of topics.

To provide another illustrative example of the concept sequence identifier process, the concept vector identifier 11 may be configured to generate concept sequences using concept annotations created by two or more different annotators, where each annotator uses its chosen set of names to refer to the collection of concepts included in a text source. For example, one annotator applied to a text source may mark up all occurrences of the concept of "The United State of America" as "U.S.A.", whereas another may mark it up as "The United States". In operation, a first concept sequence may be generated by extracting a first plurality of concepts from a first set of concept annotations for the one or more content sources, and a second concept sequence may be generated by extracting a second plurality of concepts from a second set of concept annotations for the one or more content sources. In this way, the concept vector identifier 11 may be used to bring together different annotated versions of a corpus. In another example, a first set of concept annotations may be a large collection of medical papers that are marked up with concepts that are represented in the Unified Medical Language System (UMLS) Metathesaurus. The second set of concept annotations may the same collection of medical papers that are marked up with concepts that are defined in the English Wikipedia. Since these two dictionaries have good overlap but they are not identical, they may refer to the same thing (e.g. leukemia) differently in the different sets of concept annotations.

In addition to identifying concept sequences 11A from one or more external sources 16-18, general concept sequences may be constructed out of extracted concept sequences. For example, previously captured concept sequences 109 may include a plurality of concept sequences S1, S2, . . . , Sm which originate from various sources. Using these concept sequences, the concept vector identifier 11 may be configured to form a long sequence S by concatenating the sequences S=S1S2 . . . Sm.

Once concept sequences 11A are available (or stored 109), a concept vector extractor 12 may be configured to extract concept vectors 12A based on the collected concept sequences. For example, the concept vector extractor 12 may employ a vector embedding system (e.g., Neural-Network-based, matrix-based, log-linear classifier-based or the like) to compute a distributed representation (vectors) of concepts 12A from the statistics of associations embedded within the concept sequences 11A. More generally, the concept vector extractor 12 embodies a machine learning component which may use Natural Language Processing or other techniques to receive concept sequences as input. These sequences may be scanned repeatedly to generate a vector representation for each concept in the sequence by using a method, such as word2vec. Alternatively, a matrix may be derived from these sequences and a function is optimized over this matrix and word vectors, and possibly context vectors, resulting in a vector representation for each concept in the sequence. Other vector generating methods, such as using Neural Networks presented by a sequence of examples derived from the sequences, are possible. The resulting concept vector may be a low dimension (about 100-300) representation for the concept which can be used to compute the semantic and/or grammatical closeness of concepts, to test for analogies (e.g., "a king to a man is like a queen to what?") and to serve as features in classifiers or other predictive models. The resulting concept vectors 12A may be stored in the knowledge database 110 or directly accessed by one or more vector processing applications 14.

To generate concept vectors 12A, the concept vector extractor 12 may process semantic information or statistical properties deduced from word vectors extracted from the one or more external sources 16-18. To this end, the captured concept sequences 11A may be directed to the concept vector extraction function or module 12 which may use Natural Language Processing (NLP) or machine learning processes to analyze the concept sequences 11A to construct one or more concept vectors 12A, where "NLP" refers to the field of computer science, artificial intelligence, and linguistics concerned with the interactions between computers and human (natural) languages. In this context, NLP is related to the area of human-to-computer interaction and natural language understanding by computer systems that enable computer systems to derive meaning from human or natural language input. To process the concept sequences 11A, the concept vector extractor 12 may include a learning or optimization component which receives concept sequence examples 11A as Neural Network examples, via scanning text, and the like. In the learning component, parameters (Neural Network weights, matrix entries, coefficients in support vector machines (SVMs), etc.) are adjusted to optimize a desired goal, usually reducing an error or other specified quantity. For example, the learning task in the concept vector extractor 12 may be configured to implement a scanning method where learning takes place by presenting examples from a very large corpus of Natural Language (NL) sentences. The examples may be presented as Neural Network examples, in which the text is transformed into a sequence of examples where each example is encoded in a way convenient for the Neural Network intake, or via scanning text where a window of text is handled as a word sequence with no further encoding. In scanning methods, the learning task is usually to predict the next concept in a sequence, the middle concept in a sequence, concepts in the context looked at as a "bag of words," or other similar tasks. The learning task in the concept vector extractor 12 may be also configured to implement a matrix method wherein text characteristics are extracted into a matrix form and an optimization method is utilized to minimize a function expressing desired word vector representation. The learning results in a matrix (weights, parameters) from which one can extract concept vectors, or directly in concept vectors (one, or two per concept), where each vector Vi is associated with a corresponding concept Ci. Once the learning task is complete, the produced concept vectors may have other usages such as measuring "closeness" of concepts (usually in terms of cosine distance) or solving analogy problems of the form "a to b is like c to what?"

To provide a first illustrative example for computing concept vectors from concept sequences, the concept vector extractor 12 may be configured to employ vector embedding techniques (e.g., NN, matrix-based, log-linear classifier or the like) whereby "windows" of k (e.g., 5-10) consecutive concepts are presented and one is "taken out" as the concept to be predicted. The result is a vector representation for each concept. Alternatively, the concept vector extractor 12 may be configured to use a concept to predict its neighboring concepts, and the training result produces the vectors. As will be appreciated, other vector producing methods may be used. Another interesting learning task by which vectors may be created is that of predicting the next few concepts or the previous few concepts (one sided windows).

To provide another illustrative example for computing concept vectors 12A from concept sequences 11A, the concept vector extractor 12 may be configured to employ NLP processing techniques to extract a distributed representation of NLP words and obtain vectors for the concept identifiers. As will be appreciated, the size of the window may be larger than those used in the NLP applications so as to allow for concepts to appear together in the window. In addition, a filter F which can be applied to retain non-concept words effectively restricts the words to only the ones that have a strong affinity to their nearby concepts as measured (for example, by their cosine distance to the concept viewed as a phrase in an NLP word vector production, e.g., by using word2vec).

To provide another illustrative example for computing concept vectors 12A from concept sequences 11A, the concept vector extractor 12 may be configured to employ NLP processing techniques to generate different concept vectors from different concept sequences by supplying a first plurality of concepts (extracted from a first set of concept annotations) as input to the vector learning component to generate the first concept vector and by supplying a second plurality of concepts (extracted from a second set of concept annotations) as input to the vector learning component to generate a second concept vector. If both versions of concept sequence annotations are brought together to obtain first and second concept vectors, the resulting vectors generated from the different concept sequence annotations can be compared to one another by computing similarities therebetween. As will be appreciated, different annotators do not always mark up the same text spans in exactly the same way, and when different annotation algorithms choose to mark up different occurrences of the term, a direct comparison of the resulting concept vectors just by text alignment techniques is not trivial. However, if both versions of annotated text sources are included in the embedding process, by way of association with other concepts and non-concept words, the respective concept vectors can be brought to close proximity in the embedding space. Computing similarities between the vectors could reveal the linkage between such alternative annotations.

Once concept vectors 12A are available (or stored 110), they can be manipulated in order to answer questions such as "a king is to man is like a queen is to what?", cluster similar words based on a similarity measure (e.g., cosine distance), or use these vectors in other analytical models such as a classification/regression model for making various predictions.

Types of information handling systems that can use the QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include a pen or tablet computer 120, laptop or notebook computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems.

Figure 2:
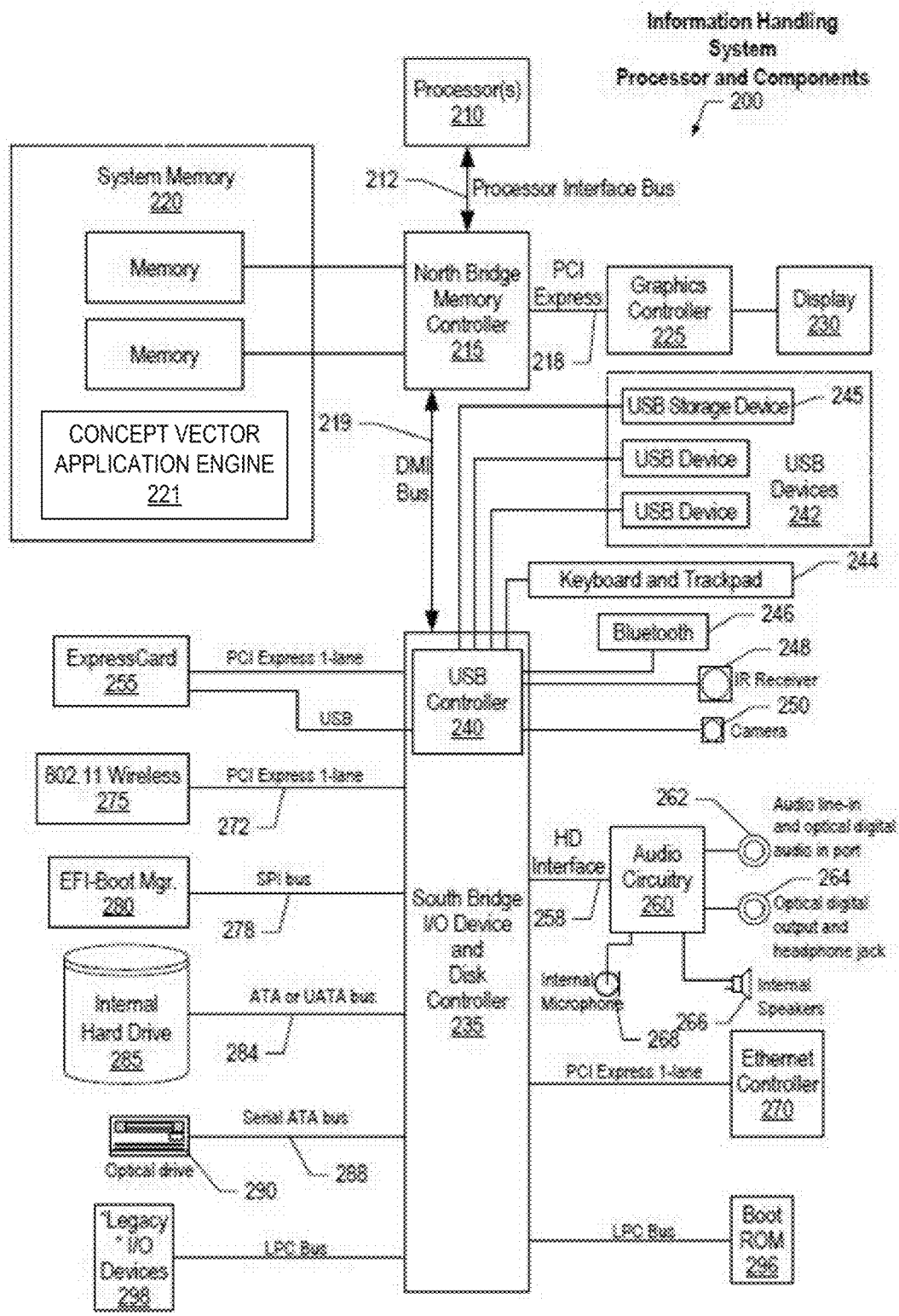
FIG. 2 is a block diagram of a processor and components of an information handling system such as those shown in FIG. 1.

FIG. 2 illustrates an illustrative example of an information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory device, including a concept vector application engine module 221 which may be invoked to process user interactions and data sources to identify concept sequences and extract therefrom concept vectors which may be used in various applications. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) and the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one example configuration for an information handling system 200, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
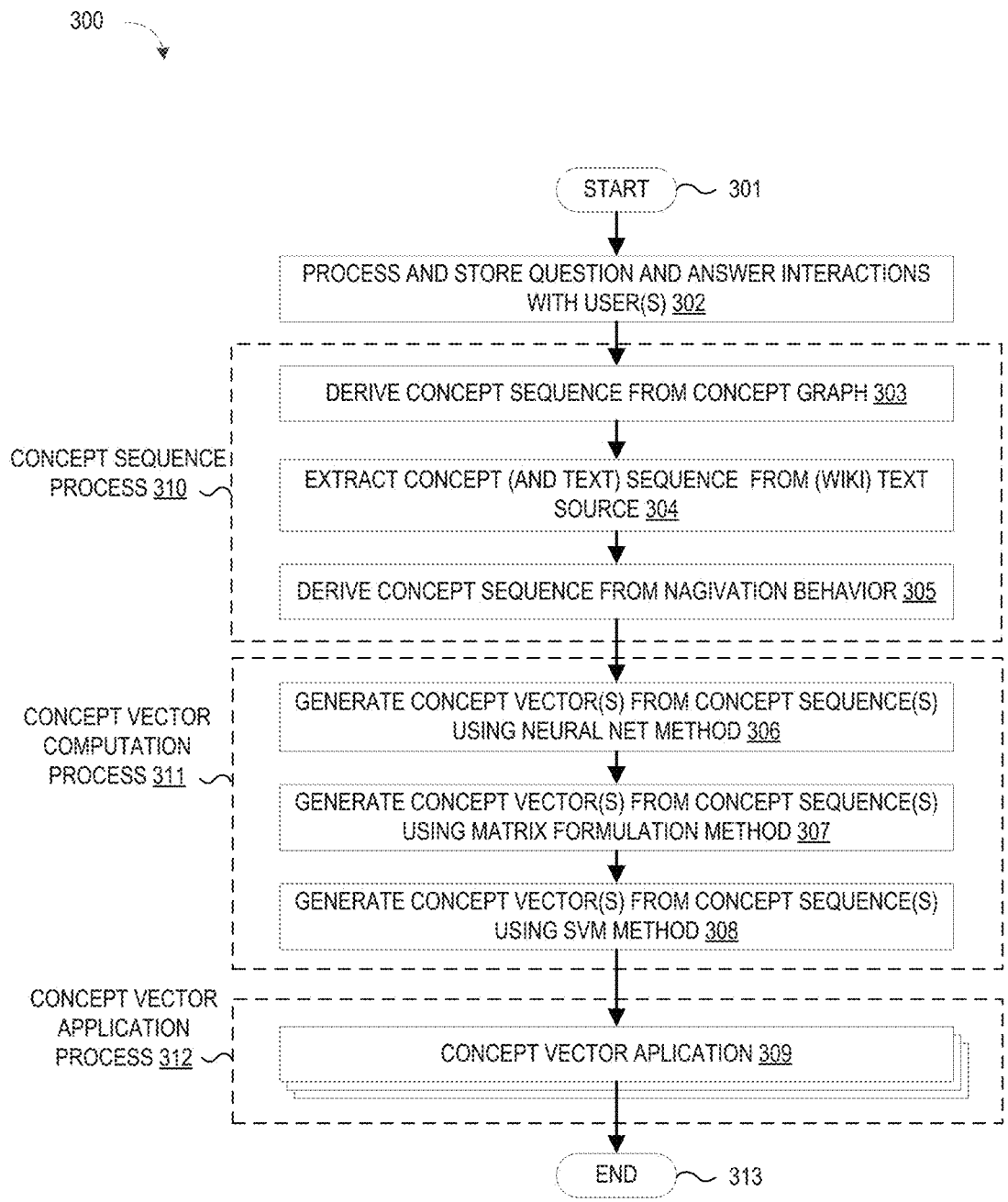
FIG. 3 illustrates a simplified flow chart showing the logic for obtaining and using a distributed representation of concepts as vectors.

To provide additional details for an improved understanding of selected embodiments of the present disclosure, reference is now made to FIG. 3 which depicts a simplified flow chart 300 showing the logic for obtaining and using a distributed representation of concepts as vectors. The processing shown in FIG. 3 may be performed in whole or in part by a cognitive system, such as the QA information handing system 15, QA system 100, or other natural language question answering system which identifies sequences of concepts to extract concept vectors (e.g., distributed representations of the concept) which may be processed to carry out useful tasks in the domain of concepts and user-concept interaction.

FIG. 3 processing commences at 301 whereupon, at step 302, a question or inquiry from one or more end users is processed to generate an answer with associated evidence and confidence measures for the end user(s), and the resulting question and answer interactions are stored in an interaction history database. The processing at step 302 may be performed at the QA system 100 or other NLP question answering system, though any desired information processing system for processing questions and answers may be used. As described herein, a Natural Language Processing (NLP) routine may be used to process the received questions and/or generate a computed answer with associated evidence and confidence measures. In this context. NLP is related to the area of human-computer interaction and natural language understanding by computer systems that enable computer systems to derive meaning from human or natural language input.

In the course of processing questions to generate answers, a collection or sequence of concepts may be processed at step 310. The concept sequence processing at step 310 may be performed at the QA system 100 or concept vector engine 13 by employing NLP processing and/or extraction algorithms, machine learning techniques, and/or manual processing to collect concepts from one or more external sources (such as the Wikipedia or some other restricted domain, one or more concept graph sources, and/or captured user navigation behavior) to generate training input comprising concept sequences. As will be appreciated, one or more processing steps may be employed to obtain the concept sequences.

For example, the concept sequence processing at step 310 may employ one or more concept graphs to generate concept sequences at step 303. To this end, the concept graph derivation step 303 may construct a graph G using any desired technique (e.g., Google graphs) to define concepts at each graph node which may be tagged with weights indicating its relative importance. In addition, the graph edges may be weighted to indicate concept proximity. By traversing the graph G using the indicated weights to affect the probability of navigating via an edge, a sequence of concepts may be constructed at step 303. In contrast to existing approaches for performing short random walks on graph nodes which view these as sentences and extract a vector representation for each node, the graph derivation step 303 may employ a random walk that is directed by the edge weights such that there is a higher probability to traverse heavier weight edges, thereby indicating closeness of concepts. In addition, the concept graphs employed by the graph derivation step 303 encodes many distinct domains may be represented as graphs that are derived non-trivially from the conventional web graph. In addition, the graph derivation step 303 may allow a graph traversal with a "one step back" that is not conventionally available. As a result, the resulting concept vectors are quite different.

In addition or in the alternative, the concept sequence processing at step 310 may employ one or more text sources to extract concept sequences at step 304. In selected embodiments, the text source is the Wikipedia set of entries or some other restricted domain. By analyzing a large corpus of documents mentioning Wikipedia entries (e.g., Wikipedia itself and other documents mentioning its entries), the text source extraction step 304 may extract the sequence of concepts, including the title, but ignoring all other text. In addition, the text source extraction step 304 may extract the sequence of appearing concepts along with additional words that are extracted with the concept in the context of surrounding its textual description while using a filter to remove other words not related to the extracted concepts. Alternatively, the text source extraction step 304 may extract a mixture of concepts and text by parsing a text source to identify concepts contained therein, replacing all concept occurrences with unique concept identifiers (e.g., by appending a suffix to each concept or associating critical words with concepts).

In addition or in the alternative, the concept sequence processing at step 310 may employ behavior tracking to derive concept sequences at step 305. In selected embodiments, the actual user's navigation behavior is tracked to use the actual sequence of explored concepts by a single user or a collection of users to derive the concept sequence at step 305. In selected embodiments, the tracking of user navigation behavior may allow non-Wikipedia intervening web exploration that is limited by duration T before resuming Wikipedia, by the number of intervening non-Wikipedia explorations, by elapsed time or a combination of these or related criteria.

After the concept sequence processing step 310, the collected concept sequences may be processed to compute concept vectors using known vector embedding methods at step 311. As disclosed herein, the concept vector computation processing at step 311 may be performed at the QA system 100 or concept vector extractor 12 by employing machine learning techniques and/or NLP techniques to compute a distributed representation (vectors) of concepts from the statistics of associations. As will be appreciated, one or more processing steps may be employed to compute the concept vectors. For example, the concept vector computation processing at step 311 may employ NL processing technique such as word2vec or to implement a neural network (NN) method at step 306 to perform "brute force" learning from training examples derived from concept sequences provided by step 310. In addition or in the alternative, the concept vector computation processing at step 311 may employ various matrix formulations at method step 307 and/or extended with SVM-based methods at step 308. In each case, the vector computation process may use a learning component in which selected parameters (e.g., NN weights, matrix entries, vector entries, etc.) are repeatedly adjusted until a desired level of learning is achieved.

After the concept vector computation processing step 311, the computed concept vectors may be used in various applications at step 312 which may be performed at the QA system 100 or the concept vector application module 14 by employing NLP processing, artificial intelligence, extraction algorithms, machine learning model processing, and/or manual processing to process the distributed representation (concept vectors) to carry out useful tasks in the domain of concepts and user-concept interaction.

By now, it will be appreciated that there is disclosed herein a system, method, apparatus, and computer program product for generating concept vectors with an information handling system having a processor and a memory. As disclosed, the system, method, apparatus, and computer program product generate concept sequences from one or more content sources by extracting a plurality of concepts to form each concept sequence. The concept sequences may be generated by performing a natural language processing (NLP) analysis of an annotated text source specializing in concepts to filter out words corresponding to non-concepts, leaving a plurality of concepts forming a concept sequence. The concept sequences may also be generated by performing a natural language processing (NLP) analysis of an annotated text source specializing in concepts to replace the words forming each concept by a marked string representing the concept, leaving other words unchanged. In addition or in the alternative, the concept sequences may be generated by performing a random walk across weighted concept nodes on a graph having edge weights, where a probability to proceed to a concept node depends on the connecting edge weight relative to edge weights of edges connecting to other concept nodes, thereby traversing a plurality of concepts forming a concept sequence. Alternatively, the concept sequences may be generated by performing a random walk across weighted concept nodes on a graph having edge weights, where a probability to proceed to a concept node depends on a connecting edge weight and on adjoining concept node's weight relative to weights of other connecting edges and adjoining concept nodes, thereby traversing a plurality of concepts forming a concept sequence. The concept sequences may also be generated by tracking at least a first user's navigation behavior over a plurality of concepts to identify a plurality of concepts forming a concept sequence. In addition, concept sequences may be generated by filtering the one or more concept sources to retain text related to a specified theme in a filtered content source before extracting the plurality of concepts from the filtered content source to form each concept sequence. From the concept sequences, at least a first concept vector for a first concept is generated by supplying the concept sequences as inputs to a vector learning component, such that the first concept vector comprises information interrelating the first concept to other concepts in the concept sequences which is inferred from the concept sequences. In selected embodiments, the first concept vector is generated by performing machine learning processing to compute the first concept vector based on statistics of associations with the first concept in one or more of the concept sequences. In other embodiments, the first concept vector is generated by performing a machine learning process to repeatedly scan the concept sequences to generate a vector representation for each concept in the sequence. After generating the first concept vector, the system may perform an analysis of the first concept vector and one or more additional concept vectors to derive relationships between different concepts. In yet other embodiments, concept sequences may be generated by extracting a first plurality of concepts from a first set of concept annotations for the one or more content sources; and by extracting a second plurality of concepts from a second set of concept annotations for the one or more content sources. In addition, the first plurality of concepts and second plurality of concepts (along with other words mixed in between) may be supplied as input to the vector learning component to generate first and second concept vectors so that both sets of vectors are derived together from the combined corpus and are therefore related through the other (contextual) words mixed in between during learning.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, for generating concept vectors, the method comprising:

generating, by the system, concept sequences from one or more content sources by extracting a plurality of concepts to form each concept sequence by performing a random walk across weighted concept nodes in a graph comprising a plurality of weighted concept nodes connected by edges having edge weights, where a probability to proceed to a second weighted concept node from a first weighted concept node depends on a connecting edge weight between the first and second weighted concept nodes and on a weight of the second weighted concept node, thereby traversing a plurality of concepts forming a concept sequence; and generating, by the system, at least a first concept vector for a first concept by supplying the concept sequences as input to a vector learning component, such that the first concept vector comprises information interrelating the first concept to other concepts in the concept sequences which is inferred from the concept sequences.

2. The method of claim 1, wherein generating concept sequences comprises performing, by the system, a natural language processing (NLP) analysis of an annotated text source specializing in concepts to filter out words corresponding to non-concepts, leaving a plurality of concepts forming a concept sequence.

3. The method of claim 1, wherein generating concept sequences comprises performing, by the system, a natural language processing (NLP) analysis of an annotated text source specializing in concepts to replace one or more words forming each concept by a marked string representing the concept, leaving other words unchanged.

4. The method of claim 1, wherein generating concept sequences comprises extracting the plurality of concepts as a sequential listing of the plurality of concepts in the order of user navigation in the one or more content sources.

5. The method of claim 1, wherein generating at least the first concept vector comprises performing, by the system, machine learning processing to compute the first concept vector based on statistics of associations with the first concept in one or more of the concept sequences.

6. The method of claim 1, wherein generating at least the first concept vector comprises performing, by the system, a machine learning process to repeatedly scan the concept sequences to generate a vector representation for each concept in the sequence.

7. The method of claim 1, wherein generating concept sequences comprises filtering, by the system, the one or more concept sources to retain text related to a specified theme in a filtered content source before extracting the plurality of concepts from the filtered content source to form each concept sequence.

8. The method of claim 1,
wherein generating concept sequences comprises:
extracting a first plurality of concepts from a first set of concept annotations for the one or more content sources, and
extracting a second plurality of concepts from a second set of concept annotations for the one or more content sources; and
wherein generating at least the first concept vector comprises supplying the first plurality of concepts and second plurality of concepts as input to the vector learning component to generate the first concept vector and a second concept vector.

9. An information handling system comprising:
one or more processors;
a memory coupled to at least one of the processors;
a set of instructions stored in the memory and executed by at least one of the processors to generate concept vectors, wherein the set of instructions are executable to perform actions of:
generating, by the system, concept sequences from one or more content sources by extracting a plurality of concepts to form each concept sequence by performing a random walk across weighted concept nodes in a graph comprising a plurality of weighted concept nodes connected by edges having edge weights, where a probability to proceed to a second weighted concept node from a first weighted concept node depends on a connecting edge weight between the first and second weighted concept nodes and on a weight of the second weighted concept node, thereby traversing a plurality of concepts forming a concept sequence; and generating, by the system, a first concept vector for a first concept by supplying the concept sequences as input to a vector learning component, such that the first concept vector comprises information interrelating the first concept to other concepts in the concept sequences which is inferred from the concept sequences.

10. The information handling system of claim 9, wherein the set of instructions are executable to generate concept sequences by performing a natural language processing (NLP) analysis of an annotated text source specializing in concepts to filter out words corresponding to non-concepts, leaving a plurality of concepts forming a concept sequence.

11. The information handling system of claim 9, wherein the set of instructions are executable to generate concept sequences by performing a natural language processing (NLP) analysis of an annotated text source specializing in concepts to replace one or more words forming each concept by a marked string representing the concept, leaving other words unchanged.

12. The information handling system of claim 9, wherein the set of instructions are executable to generate concept sequences by tracking at least a first user's navigation behavior through the one or more content sources to identify the plurality of concepts forming the concept sequence.

13. The information handling system of claim 9, wherein the set of instructions are executable to generate the first vector by performing machine learning processing to compute the first concept vector based on statistics of associations with the first concept in one or more of the concept sequences.

14. The information handling system of claim 9, wherein the set of instructions are executable to generate the first vector by performing a machine learning process to repeatedly scan the concept sequences to generate a vector representation for each concept in the sequence.

15. The information handling system of claim 9, wherein the set of instructions are executable to generate the first vector by performing a machine learning process to repeatedly scan the concept sequences to generate a vector representation for each concept in the sequence.

16. A computer program product stored in a computer readable storage medium, comprising computer instructions that, when executed by an information handling system, causes the system to generate concept vectors by performing actions comprising:
generating, by the system, concept sequences from one or more content sources by performing a random walk across weighted concept nodes in a graph comprising a plurality of weighted concept nodes connected by edges having edge weights, where a probability to proceed to a second weighted concept node from a first weighed concept node depends on a connecting edge weight between the first and second weighted concept nodes and on a weight of the second weighted concept node, thereby traversing a plurality of concepts forming a concept sequence; and
generating, by the system, a first concept vector for a first concept by supplying the concept sequences as input to a vector learning component, such that the first concept vector comprises information interrelating the first concept to other concepts in the concept sequences which is inferred from the concept sequences.

17. The computer program product of claim 16, wherein generating concept sequences comprises performing a natural language processing (NLP) analysis of an annotated text source specializing in concepts to filter out words corresponding to non-concepts, leaving a plurality of concepts forming a concept sequence.

18. The computer program product of claim 16, wherein generating concept sequences comprises performing a natural language processing (NLP) analysis of an annotated text source specializing in concepts to replace one or more words forming each concept by a marked string representing the concept, leaving other words unchanged.

19. The computer program product of claim 16, wherein generating concept sequences comprises tracking at least a first user's navigation behavior through the one or more content sources to identify the plurality of concepts forming the concept sequence.

20. The computer program product of claim 16, wherein generating the first concept vector comprises performing machine learning processing to compute the first concept vector based on statistics of associations with the first concept in one or more of the concept sequences.

21. The computer program product of claim 16, wherein generating the first concept vector comprises performing a machine learning process to repeatedly scan the concept sequences to generate a vector representation for each concept in the sequence.

* * * * *